May 2, 1967     T. A. DORIS, JR., ETAL     3,317,362
IGNITER COMPOSITION FOR AIRCRAFT EJECTION APPARATUS
Filed July 7, 1965
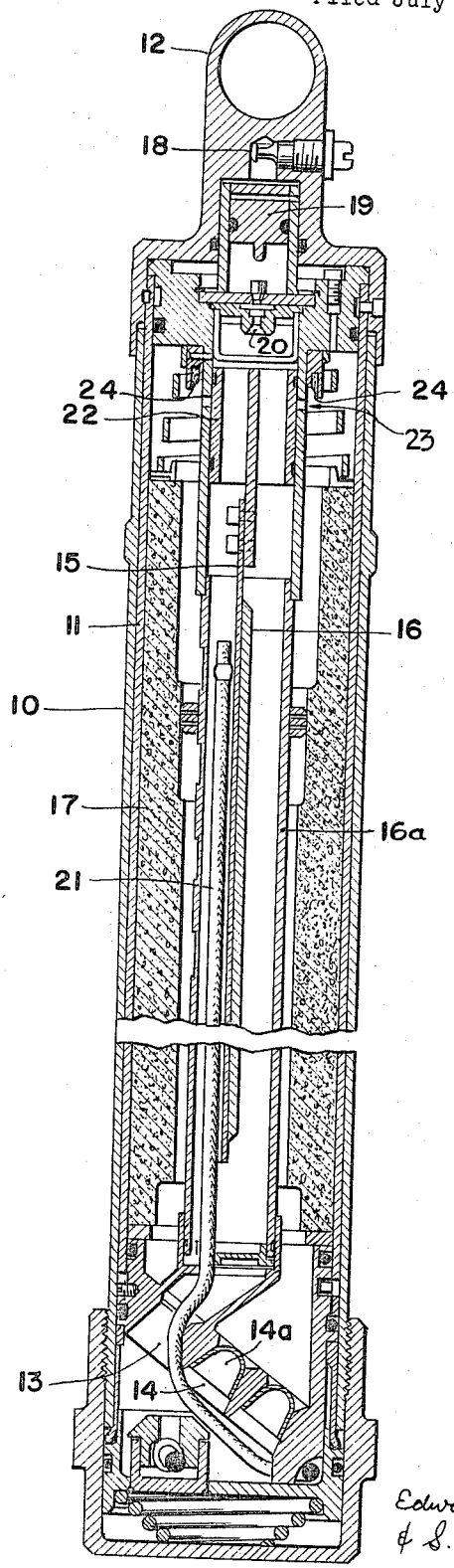
INVENTORS
THOMAS A. DORIS, Jr.
THOMAS Q. CICCONE
BY Harry M. Saragovitz,
Edward J. Kelly, Herbert Berl
& S. Dubroff
ATTORNEYS

United States Patent Office 3,317,362
Patented May 2, 1967

3,317,362
IGNITER COMPOSITION FOR AIRCRAFT EJECTION APPARATUS
Thomas A. Doris, Jr., Palmyra, N.J., and Thomas Q. Ciccone, Langhorne, Pa., assignors to the United States of America as represented by the Secretary of the Army
Filed July 7, 1965, Ser. No. 470,302
4 Claims. (Cl. 149—19)

The invention described herein may be manufactured and used by or for the Government for governmental purposes without the payment to us of any royalty thereon.

This invention relates to rocket ignition means for apparatus of the type having a rocket type ejection seat catapult for more positively insuring that an occupant of a high speed aircraft may be safely ejected therefrom when the necessity arises.

The primary object of the invention is to enable such an apparatus to possess a greater probability that the rocket will positively function to raise the seat and occupant to a greater height for clearance of the tail fins without objectionable delay.

These and other objects, advantages and features will become apparent from the following description and accompanying drawing.

The single figure of the drawing shows a longitudinal section through a concentric catapult and rocket motor apparatus embodying the principles of the invention.

In the drawing an outer housing 10 securable to an aircraft frame and telescopingly enclosing a rocket motor housing 11 for the telescoping catapult tube 16a and rocket motor propellant 17. The head or upper end 12 of housing 10 is securable to the seat to be ejected when necessary. At the lower end is a nozzle 13 through which gas from ignited catapult propellant 16 issues as the seat is raised while attached to the aircraft. The plurality of nozzles 14 are provided through which the rocket motor products of combustion are discharged as and after the seat is being raised by the rocket motor, the nozzles 14 being normally closed by the tapered caps 14a during the operation of the catapult motor. The steel supporting strip 15 has the catapult propellant 16 secured thereto within the catapult tube 16a. The rocket propellant 17 is radially outside the catapult propellant and under prior practice was not always ignited as quickly as desired. Gas pressure from any well known source enters inlet 18 and is directed to drive the firing pin 19 against a primer or primary igniter 20 that issues a suitable flame downwardly longitudinally for igniting the catapult propellant 16. A cable 21 secured at one end to the aircraft frame and at its upper end to a spider-like sleeve valve 22 which uncovers lateral openings 23 in the catapult tube 16a as the valve 22 approaches the end of its downward travel, thus enabling some of the catapult products of combustion to move radially outward through openings 23 to ignite an auxiliary igniter 24.

The auxiliary igniter 24 is formed of a much slower burning mixture and is considerably more dense than prior mixtures to more adequately assure ignition of the rocket propellant 17. The mixture of igniter 24 is compressed to substantially 16,200 p.s.i. in an open ended, grooved, annular container 25 or a powdered form of the mixture is enclosed in an appropriate combustible annular casing. Preferably, both of the containers are formed so that a leading edge of the mixture is inclined at approximately 30° to 45° to present an initial ignition surface in or near the path of impinging catapult gases exiting through lateral passage means 23 in sleeve valve 22. The ignition of the inclined mixture surface is such as to direct igniting hot particles and gases longitudinally towards the rocket propellant 17. The material for the auxiliary igniter slow burning mixture preferably includes the following parts or components by weight:

14.0% of atomized magnesium fuel made by a firing spray and of a size 100, 325 mesh in spherical form,
73.9% of powdered barium dioxide,
0.9% of zinc stearate in powdered form to facilitate the flow of material under pressure,
5.3% of a binder material of chlorinated rubber selling commercially as Parlon,
0.9% of a red dye known as Toludiene Red, and
5.0% of a calcium resinate binder material.

However, the mixture may be varied as to ingredients and percentage range thereof by weight to the following extent:

| | Percent by weight |
|---|---|
| Fuels | 12–20 |
| Magnesium—zirconium—boron | |
| Oxidizers (oxides, dioxides, nitrates or chlorates) | 70–80 |
| Barium—strontium—lead—potassium | |
| Zinc stearate | 0–2 |
| Chlorinated rubber | 0–6 |
| Dye of any preferred color | 0–1 |
| Resinate binder material | 0–8 |
| Calcium—strontium | |

Preferably, when the mixture is employed in powdered form the essential parts of the composition includes a fuel and oxidizer, the remaining parts being used when the mixture is compressed in a container.

The following test operational data was obtained for selective comparisons:

| | Ignition Delay | Pressure, p.s.i. | Burning Time (milliseconds) |
|---|---|---|---|
| Standard igniter No. 1 (least sensitive) | 700 | 75 | 15 |
| Standard igniter No. 2 | 700 | 50 | 15 |
| Compressed mixture | 500 | 25 | 240 |
| Powdered mixture in combustible casing | 40 | 15 | 260 |

Variations, various modifications, alterations or changes may be resorted to without departing from the scope of the invention as defined by the appended claims.

We claim:
1. An igniter material for assisting in igniting the rocket motor propellant aircraft seat ejection apparatus having catapult and rocket motors, comprising a mixture including the following components by weight:
   12–20% of fuel material from the group of magnesium, zirconium and boron,
   70–80% of an oxidizer from the group of an oxide or nitrate of barium, strontium and lead or a chlorate or nitrate of potassium,
   0–2% zinc stearate,
   0–6% of a chlorinated rubber binder material,
   0–1% of a red dye, and
   0–8% of a binder material from the group of calcium or strontium resinates.

2. The igniter material of claim 1 in which its fuel is an atomized magnesium fuel, the oxidizer is powdered barium dioxide, and said binder material is a calcium resinate binder.

3. The auxiliary igniter material of claim 2 wherein the material has been compressed to substantially 16,200 p.s.i.

4. A compressed igniter material for assisting in igniting the rocket motor propellant of aircraft seat ejection apparatus having catapult and rocket motors, comprising a mixture of the following components by weight:

14.0% of atomized magnesium fuel,
73.9% of powdered barium dioxide,
0.9% zinc stearate in powdered form,
5.3% of a chlorinated rubber binder material,
0.9% of a red dye, and
5.0% of a calcium resinate binder material.

References Cited by the Examiner

UNITED STATES PATENTS

| | | | |
|---|---|---|---|
| 2,823,105 | 2/1958 | Stevenson et al. | 149—44 |
| 2,988,876 | 6/1961 | Walden | 149—44 X |
| 2,990,683 | 7/1961 | Walden | 149—42 X |
| 3,069,844 | 12/1962 | Bearer | 149—44 X |

BENJAMIN R. PADGETT, *Primary Examiner.*